(12) United States Patent
Rajbharti et al.

(10) Patent No.: US 11,526,343 B2
(45) Date of Patent: Dec. 13, 2022

(54) SYSTEM FOR IMPROVED EVALUATION OF SEMICONDUCTOR HARDWARE AND CORRESPONDING METHOD

(71) Applicant: Microchip Technology Inc., Chandler, AZ (US)

(72) Inventors: Nilesh Rajbharti, Goodyear, AZ (US); Mark Ennamorato, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 133 days.

(21) Appl. No.: 16/577,251

(22) Filed: Sep. 20, 2019

(65) Prior Publication Data

US 2021/0011703 A1    Jan. 14, 2021

Related U.S. Application Data

(60) Provisional application No. 62/873,160, filed on Jul. 11, 2019.

(51) Int. Cl.
| | |
|---|---|
| *G06F 8/65* | (2018.01) |
| *G06F 11/36* | (2006.01) |
| *G06F 9/455* | (2018.01) |
| *G06F 11/14* | (2006.01) |

(52) U.S. Cl.
CPC ............ *G06F 8/65* (2013.01); *G06F 9/455* (2013.01); *G06F 11/1448* (2013.01); *G06F 11/3664* (2013.01)

(58) Field of Classification Search
USPC ........................................................ 717/171
See application file for complete search history.

(56) References Cited

U.S. PATENT DOCUMENTS

| | | | | |
|---|---|---|---|---|
| 11,080,168 | B1* | 8/2021 | Choudhury | G06F 11/3664 |
| 2008/0126803 | A1* | 5/2008 | Ginter et al. | G06F 21/10 |
| | | | | 717/178 |
| 2008/0243862 | A1 | 10/2008 | Pathak et al. | |

(Continued)

OTHER PUBLICATIONS

International Search Report and Written Opinion, Application No. PCT/US2020/013009, 16 pages, dated Apr. 6, 2020.

*Primary Examiner* — Wei Y Zhen
*Assistant Examiner* — Mohammed N Huda
(74) *Attorney, Agent, or Firm* — Slayden Grubert Beard PLLC (57) ABSTRACT

A system and method for improved evaluation of semiconductor hardware is provided. The system comprises a firmware repository server, which firmware repository server comprises a plurality of firmware packages for the one or more evaluation hardware boards. The firmware repository server is further configured to: receive a firmware request for a user evaluation hardware board from a first of the client devices, search the plurality of firmware packages for compatible firmware packages for the user evaluation hardware board, generate a catalog of the compatible firmware packages for the user evaluation hardware board, transmit the catalog to the first client device, receive a request for a user selected firmware package from the catalog of compatible firmware packages, and to transmit firmware of the user selected firmware package to the client device for installation on the user evaluation hardware board.

17 Claims, 9 Drawing Sheets

(56) References Cited

U.S. PATENT DOCUMENTS

| | | | |
|---|---|---|---|
| 2010/0011134 A1* | 1/2010 | Brockmann et al. | G06F 8/656 710/14 |
| 2013/0111457 A1* | 9/2013 | Culter | G06F 8/65 717/171 |
| 2014/0317318 A1* | 10/2014 | Wojcik et al. | G06F 8/65 710/8 |
| 2018/0101375 A1 | 4/2018 | Caporale et al. | |
| 2020/0310394 A1* | 10/2020 | Wouhaybi et al. | G06F 8/65 |

\* cited by examiner

SYSTEM FOR IMPROVED EVALUATION OF SEMICONDUCTOR HARDWARE AND CORRESPONDING METHOD

CROSS-REFERENCE TO RELATED APPLICATIONS

This application claims priority to U.S. provisional patent application 62/873,160, filed on Jul. 11, 2019 with the U.S. Patent and Trademark Office. The contents of the aforesaid provisional patent application are incorporated herein for all purposes.

TECHNICAL FIELD

The present disclosure relates to a system for improved evaluation of semiconductor hardware and a corresponding method.

BACKGROUND

Users evaluating new semiconductor hardware products, such as microcontrollers, wireless chips, e.g., for Bluetooth or Zigbee, typically purchase evaluation hardware boards/evaluation boards from the respective manufacturer. When using such hardware, the user is presented with a variety of methods to download example applications onto the hardware that enables evaluation of the functionalities of the new product, i.e., the so-called "silicon capabilities". Generally, the methods used require the user to follow lengthy instructions, download software of significant image size to another computer, and potentially use provided software tools to compile the example application before downloading it onto the evaluation hardware board.

Known approaches typically require the download and installation of a Software Development Kit (SDK) onto a user computer, usually a file of 1 gigabyte or more. The time and bandwidth necessary is considerable. The user may also have to install software tools for compiling the source code of the example functionality into binary images if pre-compiled examples are not provided in the SDK. This is potentially a lengthy and error prone process for inexperienced users. After binary images for the example are created from the SDK and compiled, these need to be transferred to the evaluation hardware board typically via USB connections. This process must be repeated for each evaluation board and each example application the user desires to evaluate.

SUMMARY

As the inventors of the instant application have ascertained, the known approaches for evaluating new semiconductor products are error prone, take a significant time to execute, and thus possibly cause user frustrations. Accordingly, a need exists for an improved system and method for evaluating and prototyping evaluation hardware boards.

The need is addressed by a system for improved evaluation of evaluation hardware boards and a corresponding method according to the independent claims. The dependent claims and the following specification discuss embodiments of the invention.

The systems and methods described herein aim to remove user friction points and thus to improve the overall process of evaluation and prototyping.

According to one aspect of the invention, a system for improved evaluation of semiconductor hardware is provided. The system comprises a firmware repository server, which firmware repository server comprises a communication interface for connection to one or more client devices. The firmware repository server comprises a plurality of firmware packages for one or more evaluation hardware boards and also comprises a processor, which is configured to receive a firmware request for a user evaluation hardware board from a first of the client devices, search the plurality of firmware packages for compatible firmware packages for the user evaluation hardware board, generate a catalog of the compatible firmware packages for the user evaluation hardware board, transmit the catalog to the first client device, receive a request for a user selected firmware package from the catalog of compatible firmware packages, and to transmit firmware of the user selected firmware package to the first client device.

According to another aspect of the invention, a method of improved evaluation of semiconductor hardware is provided, which method comprises: receiving a firmware request for an evaluation hardware board from a client device; searching a firmware repository for compatible firmware packages for the evaluation hardware board; generating a catalog of the compatible firmware packages for the evaluation hardware board; transmitting the catalog to the client device; receiving a request for a user selected firmware package from the catalog of compatible firmware packages; and transmitting firmware of the user selected firmware package to the client device.

BRIEF DESCRIPTION OF THE DRAWINGS

The above and other objects, features, and advantages of the current invention will become apparent from the following discussion of various embodiments. In the FIGS.

DETAILED DESCRIPTION

Technical features described in this application can be used to construct various embodiments of systems and methods for improved evaluation of semiconductor hardware. Some embodiments of the invention are discussed so as to enable one skilled in the art to make and use the invention.

In one aspect, a system for improved evaluation of semiconductor hardware is provided. The semiconductor hardware may comprise any type of integrated circuitry. For example, but without limitation, the semiconductor hardware may be a microcontroller, a wireless controller, or any other semiconductor device comprising a CPU capable of being controlled by software.

The system of the present aspect comprises a firmware repository server, which firmware repository server comprises a communication interface for connection to one or more client devices and which firmware repository server comprises a plurality of firmware packages for one or more evaluation hardware boards. In the context of the present discussion, the term "evaluation hardware board" is understood to refer to printed circuit boards having one or more semiconductor hardware components thereon, wired and programmed to conduct one or more of testing, evaluation, and prototyping. The term "evaluation hardware board" is used interchangeable with "evaluation board" or "development board". Unlike a general-purpose system such as a home computer, typically, an evaluation hardware board contains no power supply or enclosure in view that the board is intended for use in a laboratory environment. A 'user evaluation hardware board' means a specific (first) one of the evaluation hardware boards, e.g. one that the user is currently testing.

The firmware repository server may be of any suitable type. The term "server" as used herein refers to a computing device, programmed to provide the functionality discussed. The respective server may in one example be a "stand-alone" computer having software for providing the respective functionality. In another example, the respective server is provided as a function or instance that is executed on shared computer hardware, e.g., using multitasking or multithreading. For instance, a server as discussed herein may comprise a virtual machine with suitable programming that is executed on shared hardware together with other virtual machines. In some embodiments, the system is configured as a cloud service, in which essentially the respective functionality is provided by computing hardware in one or more data centers. The firmware repository server comprises the communication interface for connection with the one or more client devices. The communication interface may be of any suitable type to provide a data connection with the one or more client devices. For example, but without limitation, the communication interface may be a (wired or wireless) LAN/WAN interface.

As discussed in the preceding, the firmware repository server comprises a plurality of firmware packages for the one or more evaluation boards. In some embodiments, the firmware repository server comprises one or more repositories of firmware, for example stored in a database system or any other type of storage of the firmware repository server. In some embodiments, storage of firmware packages for the evaluation hardware board is provided externally on a cloud service, such as using GitHub, S3, or any equivalent thereof.

In the context of this explanation, the term 'firmware package' is understood to refer to software for an evaluation hardware board. Each firmware package may comprise at least one software application. A firmware package may comprise the at least one software application in compiled, e.g., binary, and/or uncompiled, e.g. source code, format. In some embodiments, a firmware package is provided as 'bundle' of both, the compiled binary and source code versions of the respective application. The firmware package may in some embodiments, but without limitation, be configured to allow a test of some functionality of the evaluation hardware board, i.e., an example firmware/software. It is noted that the terms 'firmware package' and 'example (board) firmware package' may be used interchangeably herein.

The firmware repository further comprises a processor. The processor may be of any suitable type and is configured to receive a firmware request for a user's evaluation hardware board from a first client device and based on the request to search the plurality of firmware packages for firmware packages that are compatible with the user evaluation hardware board. In other words, based on a user's request, a search is conducted among the plurality of stored firmware packages for compatible firmware.

To allow a determination of compatible firmware and in some embodiments, the request comprises an identifier of the user evaluation hardware board, such as one or more of a board type/model identifier, product identifier, user identifier, and a board serial number. In some embodiments, the respective identifier of the user evaluation hardware board is compared with a corresponding compatibility identifier, stored with the respective firmware bundle, for example as part of the metadata of the respective firmware bundle.

According to the present aspect, the processor of the firmware repository server is further configured to generate a catalog of the compatible firmware packages for the user evaluation hardware board and to transmit the catalog to the first client device. In other words, a listing or manifest is provided to the user via the first client device that allows to select a firmware package from the search results. It is noted that a 'client device' in the present context may be any type of computing device or computer, such as a desktop computer, laptop computer, without limitation, including mobile computing devices, such as smart phones, tablet computers, phablet computers, smart watches, or wearable smart devices, without limitation.

Once the user has selected a desired firmware package from the catalog of compatible firmware packages, a request for a user selected firmware package is transmitted by the first user device and according to the present aspect, subsequently received by the processor of the firmware repository server. The processor of the firmware repository server then may transmit (binary/compiled) firmware of the user selected firmware package to the first client device, which then may directly transmit the user selected firmware package to the user evaluation hardware board, if the board is readily available, or may store the user selected firmware package for a later installation.

As follows from the preceding, friction points are removed by providing a system with a firmware repository server as discussed, which reduces the necessary effort of the user when evaluating a hardware board. For example, the present aspect avoids the need to install the otherwise typical numerous software tools, compile programs, and/or download large SDKs.

As discussed above, typical evaluation boards require the following steps: 1) consider the relevant documentation, 2) installing a so-called toolchain/SDK (typically a 500 MB+ download), 3) locate example projects in the toolchain/SDK, and 4) build & download the example to the board. The total time for conducting these steps may amount to one day.

The present aspect on the other hand provides significant time savings by streamlining the process of selecting and installing exemplary software on the evaluation hardware board. The total time for conducting the necessary steps as discussed in the preceding, may be in the range of minutes.

In some embodiments, the catalog comprises metadata of the compatible firmware packages. The metadata may comprise one or more of a compatibility identifier, a title of the firmware package, a description of the firmware package, and a description of a required secondary application, without limitation. In some embodiments, a description is provided as part of the metadata that may be shown to the user by the client device to help the user select the desired firmware.

In some embodiments, the processor of the firmware repository server is additionally configured to determine if a secondary application is required for the user selected firmware package. This may, e.g., be the case if a specific functionality to be tested requires interaction with the secondary application. For example, a temperature sensing functionality of the selected firmware package may require the secondary application to display the temperature reading on the first client device. In some embodiments and in case the secondary application is required, the firmware repository server automatically transmits the secondary application to the first client device. In some embodiments, the secondary application is configured for execution on the first client device and for interfacing with the user selected firmware package when executed on the user evaluation hardware board.

In some embodiments, the secondary application is stored on the firmware repository server as part of the respective firmware package. In some embodiments, the secondary application is stored on the firmware repository server, separate from the respective firmware package. In some embodiments, the secondary application is stored on a storage device, separate from the firmware repository server. In some embodiments, the secondary application is stored in an 'app store' such as a smartphone app store. In these embodiments, a link to the secondary application may be provided to the user.

In some embodiments, the system comprises a compiler. A compiler allows to (automatically) compile uncompiled firmware and to obtain compiled firmware file(s) that can readily be executed by the evaluation hardware board. The compiler may in some embodiments be integrally formed with the firmware repository server. Alternatively, the compiler may in some embodiments be formed integrally with other components of the system, as discussed in the following, or be formed separately as a 'stand-alone' compiler on a suitable computing system.

In some embodiments, the user selected firmware package comprises uncompiled firmware and the compiler is configured to, prior to transmitting the user selected firmware package, compile the uncompiled firmware to obtain compiled firmware for transmission to the client device. In some embodiments, the compiler is configured to transmit the obtained compiled firmware to the first client device. The aforementioned operation in some embodiments may be conducted automatically, for example in case the firmware repository server determines that the user selected firmware package does not comprise compiled firmware. The corresponding operation speeds up the overall procedure and further enhances the usability of the system.

In some embodiments, the system further comprises a remote firmware editor, connected with the firmware repository server and configured to provide a graphical firmware editor. The remote firmware editor may allow a user to create or edit a firmware package using a suitable (graphical) user interface. For example, the remote firmware editor may be configured to provide a web-based editor that the user can access through the client device or a different user device.

In some embodiments, the remote firmware editor is configured to access a first firmware package of the plurality of firmware packages of the firmware repository server and to display source code firmware of the first firmware package to the user using the graphical firmware editor. The present embodiments allow a user to edit firmware efficiently. In some embodiments, the remote firmware editor is configured to store an edited firmware package on the firmware repository server. It is noted that while in some embodiments, the original firmware package stored on the firmware repository server may be overwritten after editing, in other embodiments the edited firmware package is stored without overwriting the original firmware package. For example, the user's edited firmware may be stored in the respective user's private repository, which will be discussed in more detail in the following. In some embodiments, the edited firmware is transferred to the client device instead of, or in addition to, transferring the edited firmware to the firmware repository server.

In some embodiments, the remote firmware editor is configured to create a new firmware package from user entry. The new firmware package may be created entirely 'from scratch', or using a template provided by the remote firmware editor. In some embodiments, the remote firmware editor is configured to store the created firmware on the firmware repository server. In some embodiments, the created firmware is transferred to the client device instead of, or in addition to, transferring the edited firmware to the firmware repository server.

In some embodiments, a compiler is used to compile edited or created firmware packages. As discussed in the preceding, the compiler may in some embodiments be integrally formed with the firmware repository server, be integrally formed with the remote firmware editor, or be formed separately from the aforementioned components.

In some embodiments, the system comprises a collaboration management server, connected at least with the firmware repository server and configured with one or more user accounts, wherein the firmware repository server is configured to control access to one or more of the plurality of firmware packages based on the one or more user accounts.

The collaboration management server may be of any suitable type to manage user accounts and to set access rights of one or more of the plurality of firmware packages based on the user accounts. In some embodiments, the collaboration management server comprises a database for managing a plurality of user accounts. In some embodiments, the collaboration management server is configured to allow users to create/edit user accounts, e.g., using a web-based management dashboard. Access to firmware packages may be granted or restricted based on a read-only, read-write, and no-access basis.

In some embodiments, the firmware repository server comprises a public firmware repository for one or more firmware packages and one or more private firmware repositories for one or more firmware packages, wherein the firmware repository server is configured to control access at least to the one or more private firmware repositories based on the one or more user accounts.

As will be apparent from the preceding, the present embodiments allow to keep firmware packages private, i.e., in a private firmware repository, while it is also possible to provide firmware packages to the public firmware repository and thus, e.g., to publish the respective firmware package, e.g., enable access for all users of the system. In some embodiments, access rights on the public firmware repository allow the creator of the respective firmware package to edit and delete the respective firmware package, while other users have read-only access. In some embodiments, access rights on the private firmware repositories provide the associated user, as identified by the user account, with full read-write access, while all other users have no access. In some embodiments, the firmware repository server comprises at least one private firmware repository per user account, defined on the collaboration management server. In some embodiments, the collaboration management server allows a user to provide access to his entire private repository or to selected firmware packages to other users, which enables firmware sharing. In some embodiments, the collaboration management server upon setting up sharing for a repository or firmware packages, automatically notifies the user that the repository or firmware package is shared with, e.g., by sending an e-mail to an e-mail address associated with the respective user account.

In some embodiments, the collaboration management server is configured with one or more user groups of user accounts and the firmware repository server is configured to control access to one or more of the private firmware repositories based on the one or more user groups. The present embodiments provide group-based sharing by providing group firmware repositories. In some embodiments, the collaboration management server is configured to allow users to create user groups and to associate and disassociate user accounts with the group, e.g., via the discussed web-based dashboard. In some embodiments and in addition to access to the public repository and the respective user's private repository, a group membership also provides access to the respective group's private repository. This is particularly useful for sharing of firmware packages within departments of corporations or sharing of firmware packages for a class, e.g., in a classroom scenario.

In some embodiments, the system comprises at least the first client device, which client device is connectable to the user evaluation hardware board. In some embodiments, the system comprises a plurality of client devices. In some embodiments, the client devices are configured to wirelessly connect to the at least one evaluation hardware board. In other words, no physical connection to the evaluation hardware board is required, which otherwise may require a computer system and appropriate USB or serial drivers.

According to another aspect, a (e.g., computer-implemented) method of improved evaluation of silicon hardware is provided. The method comprising: receiving a firmware request for an evaluation hardware board by a server from a client device; searching a firmware repository, comprising a plurality of firmware packages for compatible firmware packages for the evaluation hardware board; generating a catalog of the compatible firmware packages for the evaluation hardware board; transmitting the catalog to the client device; receiving a request for a user selected firmware package from the catalog of compatible firmware packages; and transmitting firmware of the user selected firmware package to the client device for installation on the evaluation hardware board.

The firmware repository server in some embodiments may be configured as discussed in the preceding with reference to the first aspect. With respect to terms used in the explanation of the present aspect and their definitions, reference is made to the first aspect.

According to another aspect, a client device for use in a system for improved evaluation of semiconductor hardware is provided. The client device comprises an interfacing host application, configured to: send a firmware request for a user evaluation hardware board to a firmware repository server; receive a catalog of the compatible firmware packages for the user evaluation hardware board; transmit a request for a user selected firmware package from the catalog of compatible firmware packages to the firmware repository server; and to receive firmware of the user selected firmware package for installation on the user evaluation hardware board.

The client device in some embodiments may be configured as discussed in the preceding with reference to the first aspect. With respect to terms used in the explanation of the present aspect and their definitions, reference is made to the first aspect.

Reference will now be made to the drawings in which further embodiments are discussed and in which various elements will be given numerical designations.

Specific references to components, process steps, and other elements are not intended to be limiting. Further, it is understood that like parts bear the same or similar reference numerals when referring to alternate figures. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

As discussed in the preceding, an issue exists when using evaluation hardware boards that may lead to a high level of user effort being necessary, but also to a high level of user frustration during the process. Although evaluation hardware boards are intended to be used by professionals, such as electrical/electronic engineers, the inventors of the instant invention have ascertained that current methods and systems lead to a substantial amount of effort and time being necessary that could be spent on more productive work.

Accordingly, a system for improved evaluation of evaluation hardware boards is suggested that alleviates the problems of the prior art. In some embodiments, users are able to quickly browse available example firmware packages via a firmware repository server to evaluate the silicon/semiconductor devices on the evaluation hardware board, select an example, and initiate the download of the example board firmware package to the evaluation hardware board, providing a "one step process" of browse and select. Other necessary steps may be automatically invoked to further improve the usability of the system.

Figure 1:
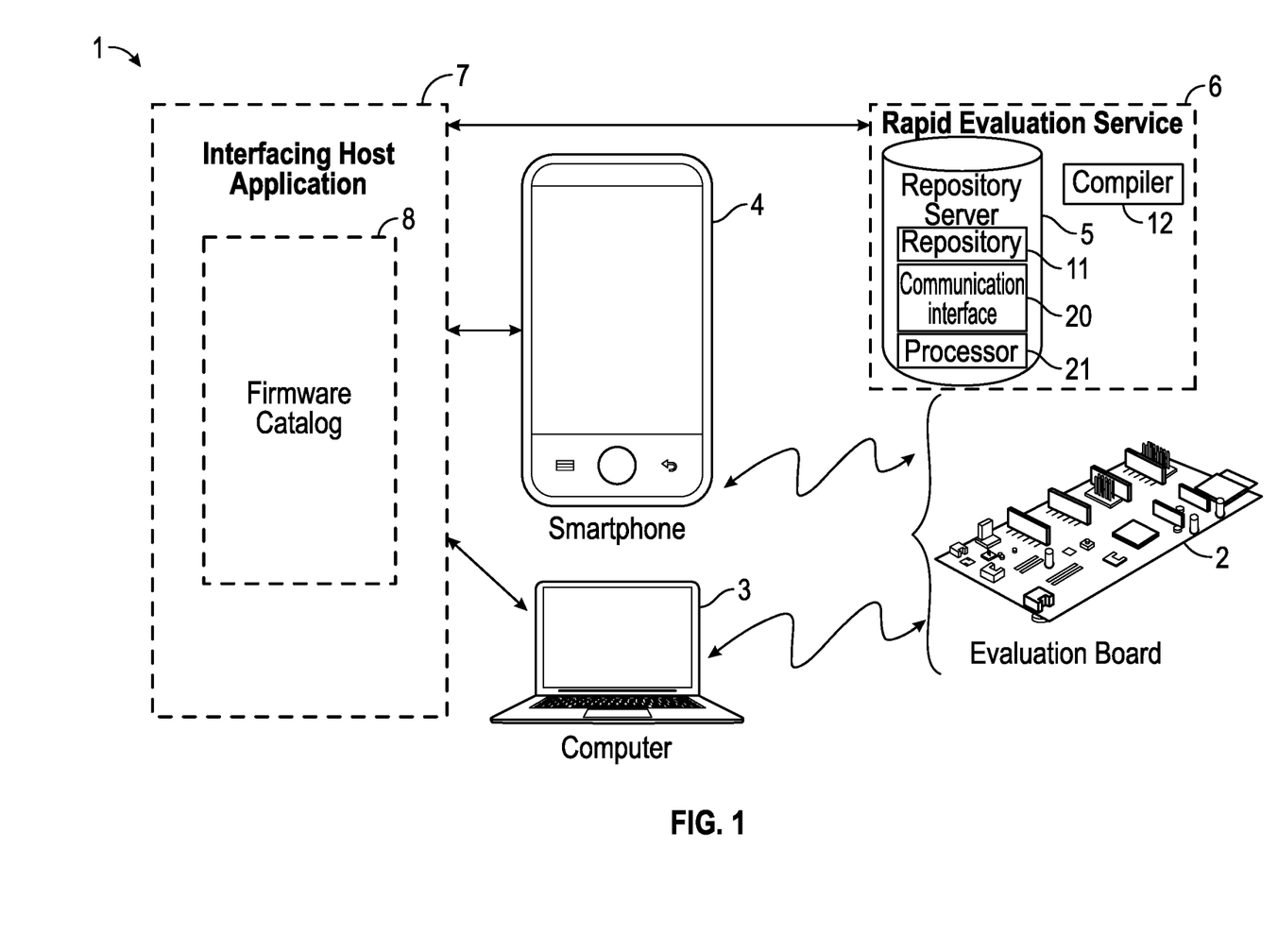
FIG. 1 shows an embodiment of an evaluation system in a schematic view.

FIG. 1 shows an embodiment of a system 1 for improved (rapid) evaluation of semiconductor hardware in a schematic view. System 1 comprises a user evaluation hardware board 2, which comprises the semiconductor hardware component(s) to be evaluated/tested and which is pre-programmed with a minimal bootloader that provides wireless functionality, using a Wi-Fi or Bluetooth stack, and file transfer functionality. The user evaluation hardware board 2 may also contain one example firmware for an exemplary functionality (e.g., gyroscopic acceleration sensing) that was programmed into it during manufacturing.

The user evaluation hardware board 2 interfaces with multiple client devices 3,4, namely with a computer 3 or with a mobile device 4, such as a smart phone or tablet (e.g. iOS, Android, without limitation), either wirelessly or over a wired connection. Suitable wireless communication protocols include Wi-Fi, Bluetooth (low energy), NFC, Zigbee, and others. Suitable wired communication protocols include USB, Ethernet, RS232, and others.

To initialize the system 1, the user installs an interfacing host application 7 on the mobile device 4 or on the computer 3, for example using the appropriate app store. Optionally, the user evaluation hardware board 2 or its packaging may comprise a machine-readable code (e.g., barcode, QR code) that contains an URL for a download location of the interfacing host application 7 and that can be scanned, e.g., with a camera of the mobile device 4. The use of a mobile device 4 (e.g., a smartphone/tablet), in particular one with a managed (closed) operating system (such as for example, iOS or Android without limitation) is beneficial to streamline the process.

The interfacing host application 7 connects to a firmware repository server 5 of the system 1, which server 5 is part of a rapid evaluation (cloud) service 6, over the Internet using a LAN, Wi-Fi, or mobile (e.g., LTE) connection. The firmware repository server 5 comprises a communication interface 20 and a processor 21. The communication interface 20 enables communication, e.g., with the interfacing host application 7. The processor 21 in this exemplary embodiment is a CPU, configured with corresponding software programming to operate as discussed in the following, e.g. with reference to FIGS. 2A and 2B.

The firmware repository server 5 may further comprise one or more firmware repositories 11 of board firmware packages. Each board firmware package comprises firmware for evaluation hardware boards, such as user evaluation hardware board 2 in compiled and/or uncompiled format and metadata, in particular a compatibility identifier (model or type), a title/name of the firmware package, firmware description text, URL to firmware user guide, size of firmware image, and name of optional secondary (mobile/computer) application that may be required to exercise this example. Alternatively, the firmware repository server 5 in some embodiments may just comprise a directory of databases, the metadata, as well as a link to external storage of the associated firmware, such as AWS S3 or GitHub, so as to facilitate a download of the firmware to be installed on the user evaluation hardware board 2.

Figure 2A:
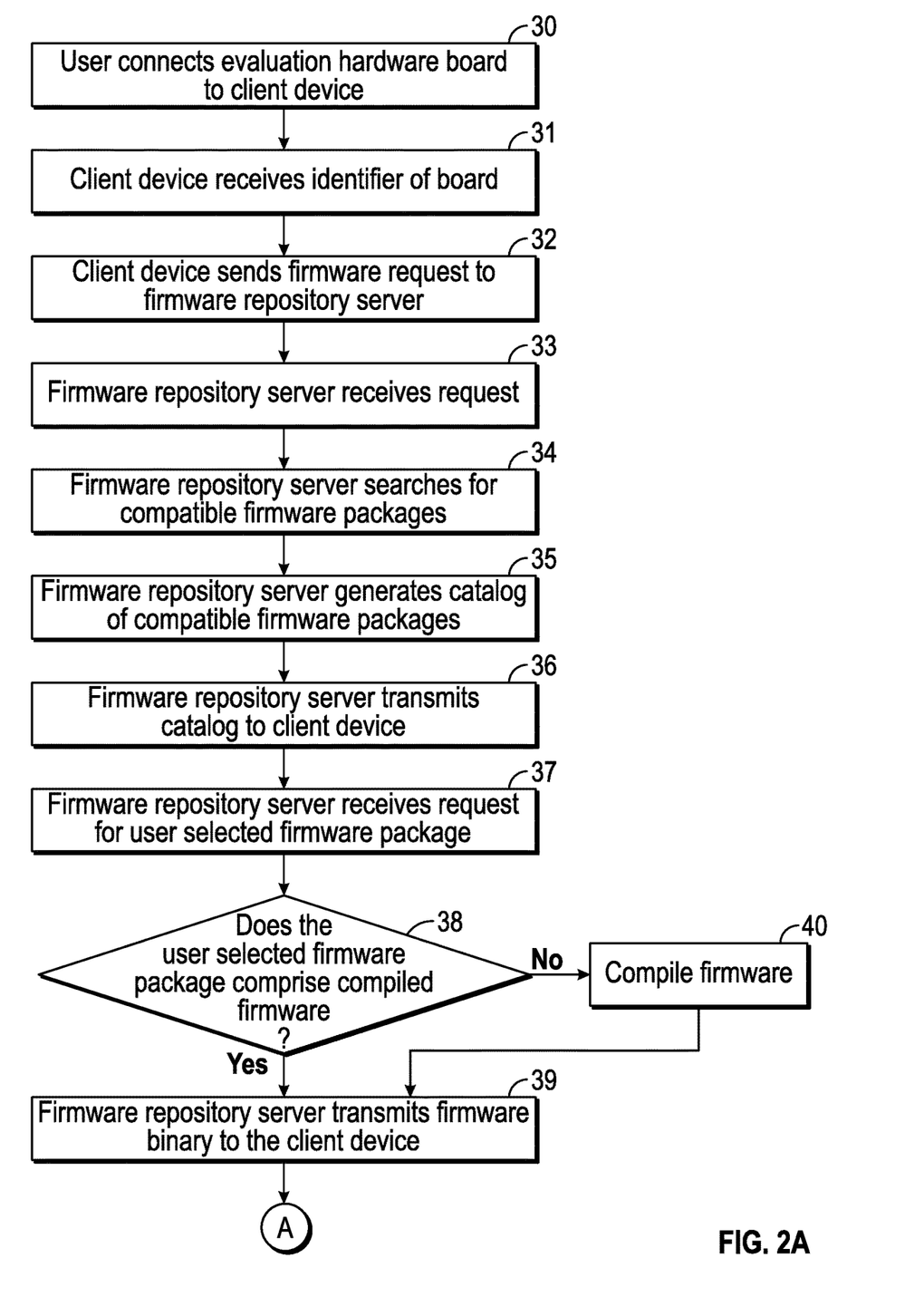
FIGS. 2A and 2B show a schematic flow diagram of the operation of evaluation system 1 of FIG. 1.
Figure 2B:
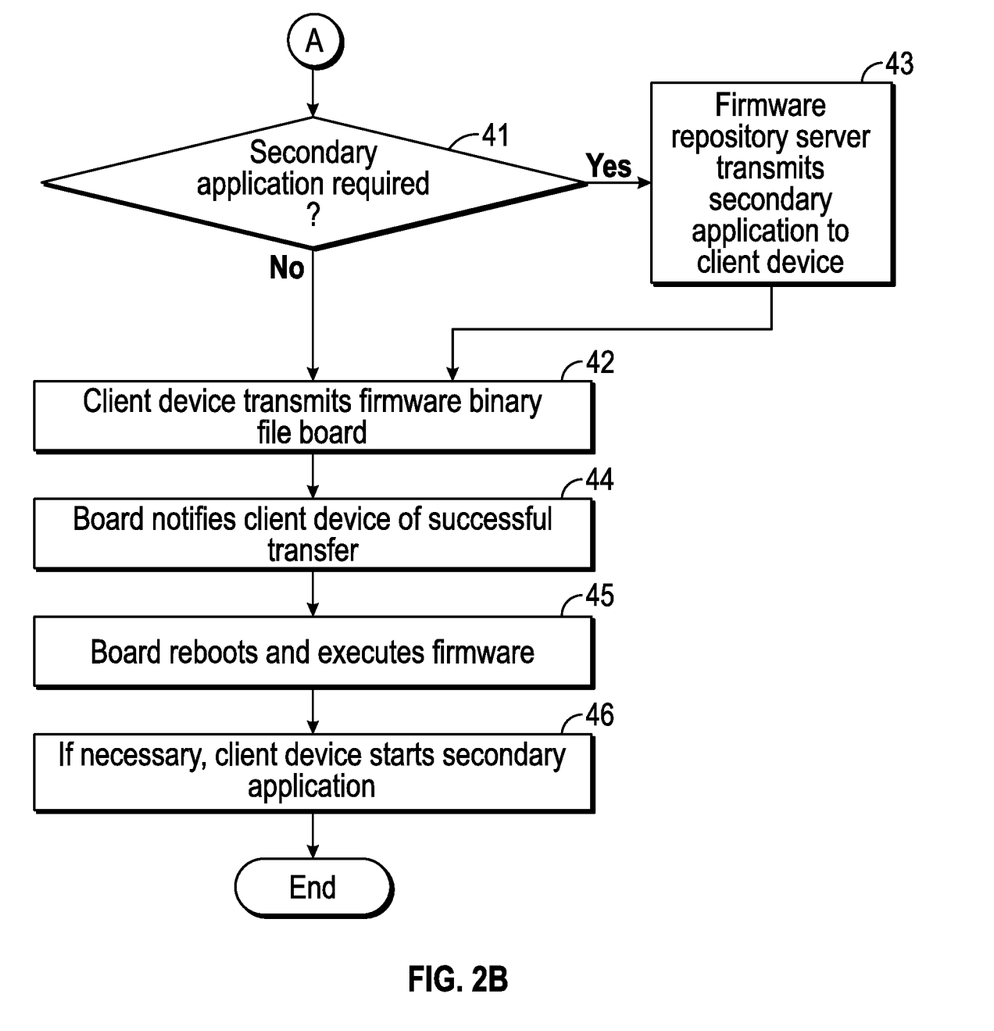

The operation and in particular the interaction between the client device 3, 4 and the firmware repository server 5 is discussed in the following with reference to the flow diagram of FIGS. 2A and 2B.

By way of example, it is assumed in the following that the user evaluation hardware board 2 is configured for Bluetooth wireless communication with the mobile device 4. As discussed in the preceding, other communication protocols and mediums may be used. Instead of mobile device 4, the process may be conducted using client device 3, i.e., the computer.

The operation begins in step 30 after initialization of the system 1 by the user connecting the user evaluation hardware board 2 to power. The bootloader of the board 2 then generates a Bluetooth Low Energy (BLE) advertisement with an identifier (friendly name) of the user evaluation hardware board 2 that is received by the mobile device 4 in step 31. The identifier allows to identify the type of the user evaluation hardware board 2 and its revision number. The client device 4 then in step 32 sends a firmware request to the firmware repository server 5, comprising the type identifier of user evaluation hardware board 2, which the firmware repository server 5 receives in step 33. The firmware repository server 5, i.e., its processor 21, in step 34 searches the plurality of firmware packages for compatible firmware packages for the user evaluation hardware board 2. This step provides that only firmware packages are shown to the user that are suitable for the user evaluation hardware board 2, as identified by type and revision.

In step 35, a catalog/manifest of compatible firmware packages is generated by the processor 21 of firmware repository server 5. The catalog provides a list of all currently available example firmware packages applicable to the currently connected user evaluation hardware board 2, together with the stored description, title, and size. The catalog/manifest is transmitted to the client device 4 in step 36 and is subsequently displayed on the screen of the client device 4.

The catalog is shown on client device 4 in a "store-format", similar to existing user experiences, e.g. within the interfacing host application 7 as a firmware store browser 8 that preferably allows a 'one-click' installation of the selected firmware on the evaluation hardware board.

The firmware store browser 8 will present the user with the catalog of compatible board firmware packages and a brief description text, as well as a notification if a secondary application is required to support the board firmware package and whether that secondary application is already installed on the client device 4.

The user may select the desired example firmware package with a tap on the firmware name or symbol within the firmware store browser 8, shown on client device 4, upon which a request for a user selected firmware package is transmitted to firmware repository server 5. In step 37, firmware repository server 5 receives the request.

In step 38, the processor 21 of firmware repository server 5 determines, if the selected firmware package comprises at least a compiled firmware that can be readily installed on the user evaluation hardware board 2. If the selected firmware package comprises at least (compiled) binary firmware, firmware repository server 5 initiates the downloading of a firmware binary file of the selected firmware package to temporary storage on the client device 4 in step 39. If the selected firmware package comprises only uncompiled firmware, compiling step 40 is executed by compiler 12 of the rapid evaluation service 6, prior to downloading of the firmware binary file to the client device 4 in step 39. The operation of step 40 is preferably conducted automatically without any user interaction being necessary.

In step 41, the processor 21 of firmware repository server 5 determines if the selected firmware package requires a secondary application. If a required secondary application is not already installed, but necessary, it is transmitted by the firmware repository server 5 to the client device 4 in step 43. If not completed prior, the user then may power on the user evaluation hardware board 2 using a battery or USB power supply, which immediately causes the pre-programmed bootloader to run.

After the client device 4 has finished downloading the example firmware, it scans for BLE advertisements using the friendly name associated with the user evaluation hardware board 2, makes a BLE connection, then in step 42 transfers the firmware binary from temporary storage to memory storage (not shown) of the user evaluation hardware board 2. The user evaluation hardware board 2 notifies the interfacing host application 7 of a successful file transfer in step 44, reboots itself (if required), and executes the now installed firmware in step 45. Upon receipt of a 'success' message from user evaluation hardware board 2, the interfacing host application 7 launches the secondary app, if required in step 46. The operation is then complete.

It is noted that the system 1 of FIG. 1 may have more than one mobile device 4 or computer 3 connecting to the rapid evaluation (cloud) service 6. For example, different users may connect to rapid evaluation (cloud) service 6 simultaneously. The rapid evaluation (cloud) service 6 in such case may be configured to handle different instances of user evaluation hardware board 2, as identified by an at least quasi-unique identifier (serial) of the board, user accounts, and/or an at least quasi-unique identifier of the respective mobile device 4 or computer 3 (e.g., IP address). In case of the presence of a web server UI of rapid evaluation (cloud) service 6, the client-side script will extract board-specific examples and show them within firmware store browser 8.

As will be apparent from the preceding, the rapid evaluation system 1 allows for a friction-less evaluation of semiconductor hardware on user evaluation hardware board 2 also by non-experienced users. The rapid evaluation system 1 also allows updates and additions of the cloud-based example firmware, stored on repository server 5 in a quick and easy way.

Figure 3:
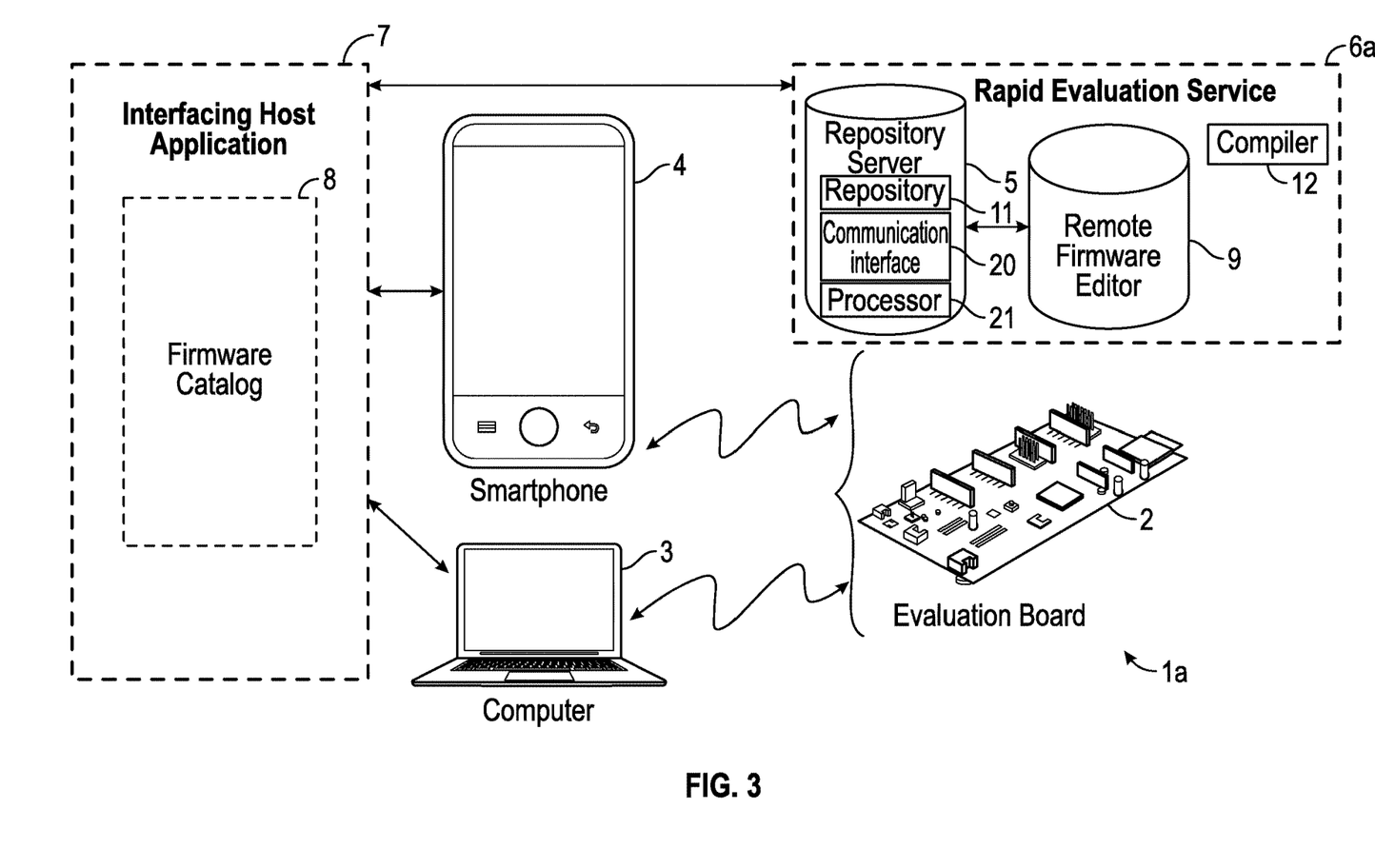
FIG. 3 shows a further embodiment of an evaluation system in a schematic view.

FIG. 3 shows a further exemplary embodiment of a rapid evaluation system 1a in a schematic view. The system 1a corresponds to system 1, discussed in detail in the preceding with reference to FIG. 1 with the following exceptions.

As can be seen from FIG. 3, the rapid evaluation service 6a in addition to firmware repository server 5 and compiler 12 comprises a remote firmware editor 9. The remote firmware editor 9 comprises a processor (not shown) that is configured to allow the user to create their own firmware package, or make changes to a firmware package, stored on repository server 5. In some embodiments, the remote firmware editor 9 is a server, running an instance of an online integrated development environment, such as MPLAB Xpress, available from Microchip Technology Incorporated, Chandler, Ariz., USA.

Remote firmware editor 9 is connected with the firmware repository server 5 and also with the interfacing host application 7 that is executed on mobile device 4 or computer 3. The latter connection to interfacing host application 7 is established over the Internet. Remote firmware editor 9 provides a web-based graphical firmware editor (GUI, e.g., Ajax-based) that allows the user to connect over the Internet using a web browser or alternatively, using the interfacing host application 7.

When a user would like to edit an example firmware, the user may, using the web-based firmware or alternatively, using the interfacing host application 7, select a board firmware package, stored on the firmware repository server 5. In both cases, it is necessary that the respective firmware package comprises source code and not just a compiled firmware file.

Figure 4:
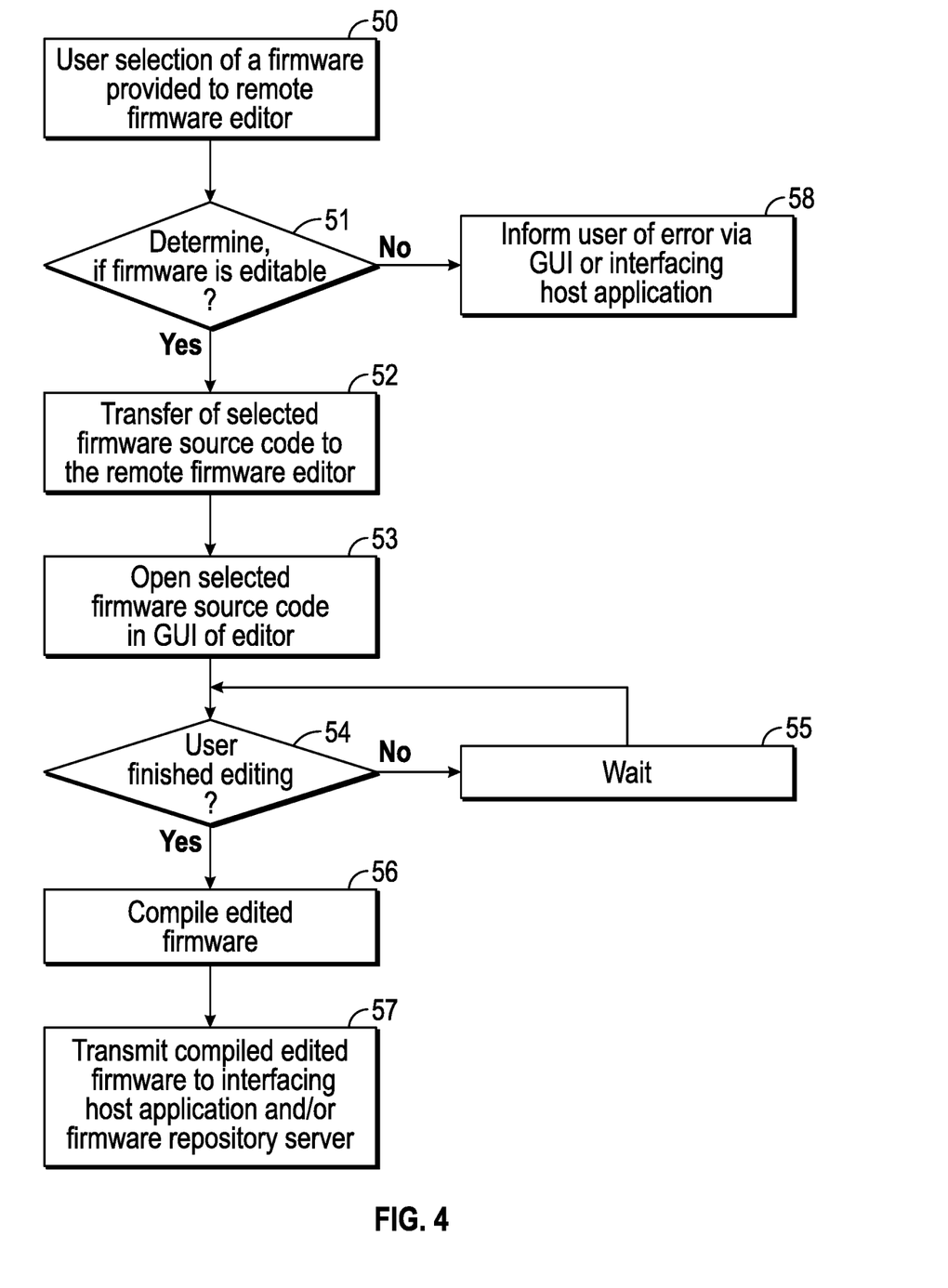
FIG. 4 shows a schematic flow diagram of the operation of a remote firmware editor of the embodiment of FIG. 3.

The operation of remote firmware editor 9 is discussed in more detail with reference to the flow diagrams of FIGS. 4 and 5.

The operation begins with the user selecting a particular firmware package from a catalog of firmware in step 50 preferably using the remote firmware editor 9. The catalog of firmware is preferably transferred to the remote firmware editor 9 before this step so that a list of firmware packages is presented on the graphical firmware editor. Upon the user selecting the desired firmware package, the firmware repository server 5 is contacted.

In step 51, it is determined if the particular selected firmware package is editable. For example, to be editable, it is necessary for the selected firmware package to have source code available as a part of that package. Even if the selected firmware package comprises source code, the firmware package may be marked by its author as read-only, so that no editing of the firmware package is allowed. In these instances, i.e., if the firmware package is not editable, an error message is displayed in step 58. Otherwise, the firmware repository server 5 in step 52 transfers the source code of the selected firmware package to the remote firmware editor 9 for editing by the user in step 53, where the selected firmware package is opened in a GUI of the remote firmware editor 9.

During the user's editing, the remote firmware editor 9 in steps 54 and 55 checks, if the user finished her or his editing, and waits if not.

Once editing is complete, the compiler 12 in step 56 compiles the edited firmware. In step 57 the compiled edited firmware is transferred to the interfacing host application 7, as identified by a user account or a board identifier (e.g., serial number), so that the user can try out the edited firmware on user evaluation hardware board 2.

Alternatively, the remote firmware editor 9 or the compiler 12 in step 57 may transfer the edited firmware as a firmware package (compiled and source code versions) to firmware repository server 5 to be stored, for example in a private repository of the respective user.

Figure 5:
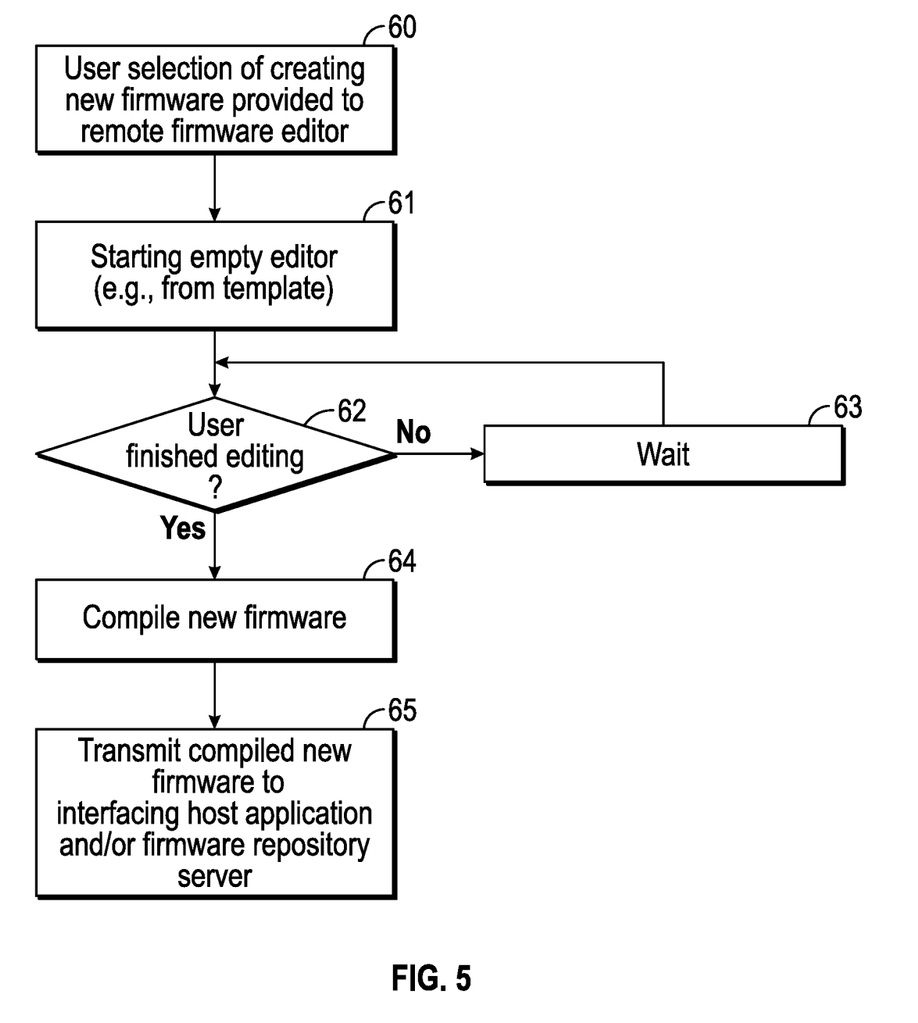
FIG. 5 shows another schematic flow diagram of the operation of a remote firmware editor of the embodiment of FIG. 3.

FIG. 5 shows the operation of remote firmware editor 9 in case a user desires to create a new firmware package. In step 60, the corresponding operation is selected in the graphical firmware editor by the user. The editor then in step 61 starts an empty editing window or loads a template if selected by the user in step 60.

The remote firmware editor 9 in steps 62 and 63 checks, if the user finished her or his editing and waits if not. Once editing is complete, the compiler 12 in step 64 compiles the created new firmware. In step 65, the compiled created new firmware is transferred to the interfacing host application 7, as identified by a user account or a board identifier (e.g., serial number), so that the user can try out the edited firmware on user evaluation hardware board 2.

Alternatively, the remote firmware editor 9 or the compiler 12 in step 65 may transfer the created new firmware as a firmware package (compiled and source code versions) to firmware repository server 5 to be stored for example in a private repository of the respective user.

Figure 6:
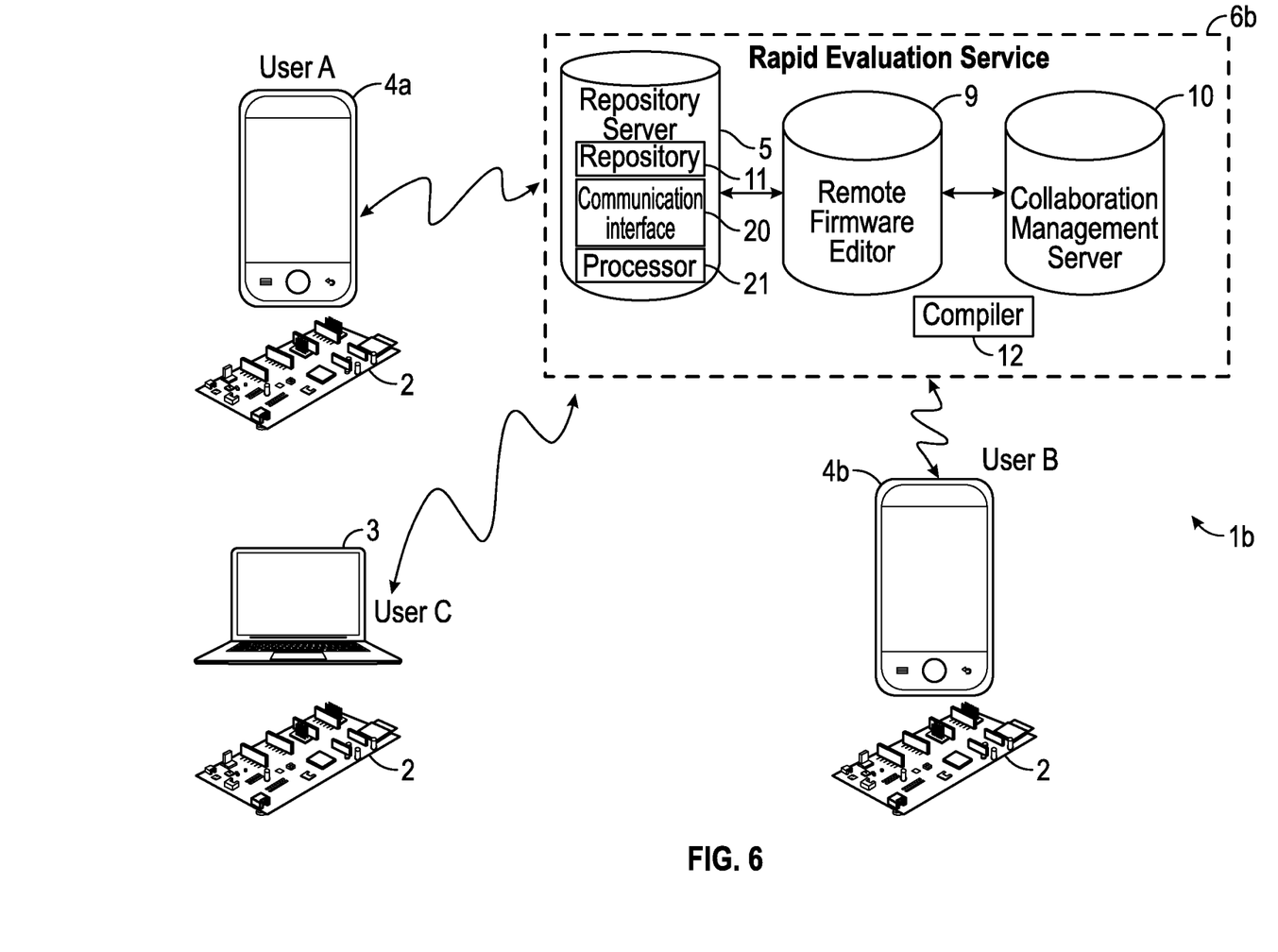
FIG. 6 shows a further embodiment of an evaluation system in a schematic view.

FIG. 6 shows another embodiment of a rapid evaluation system 1b in a schematic view. The embodiment of FIG. 6 corresponds to the embodiment of FIG. 3 with the exception that the rapid evaluation service 6b in this embodiment further comprises collaboration management server 10, and that multiple users are shown, particularly User A with respective mobile device 4a and associated user evaluation hardware board 2, User B with respective mobile device 4b and associated user evaluation hardware board 2, and User C with respective mobile device 4c and associated user evaluation hardware board 2. It is noted that the shown firmware repository server 5, remote firmware editor 9, and/or collaboration management server 10 may in an embodiment be implemented in an integrated way, i.e., using a single server or computing system, such as for example using virtualization technology or multitasked processes. Alternatively, one or more of repository server 5, remote firmware editor 9, and/or collaboration management server 10 may be provided on dedicated hardware within the rapid evaluation (cloud) service 6b. In this case, connections between the separate components may be setup using corresponding (Ethernet) interfaces and connections.

The collaboration management server 10 of the embodiment of FIG. 6 comprises a processor (not shown) that is configured to provide virtual collaboration between different users. This may for example be helpful for distributed development groups or school classes, e.g., "classroom sharing".

To initiate the setup for virtual collaboration, users of the system 1b complete a sign-up process with a web-based dashboard of collaboration management server 10 to setup corresponding user accounts. Users can also form user groups. The user accounts and the user groups are used by the firmware repository server 5 to control access to a plurality of repositories and firmware packages. The access control may provide full read-write access, read-only access, and no access and can be set by the respective user.

Figure 7:
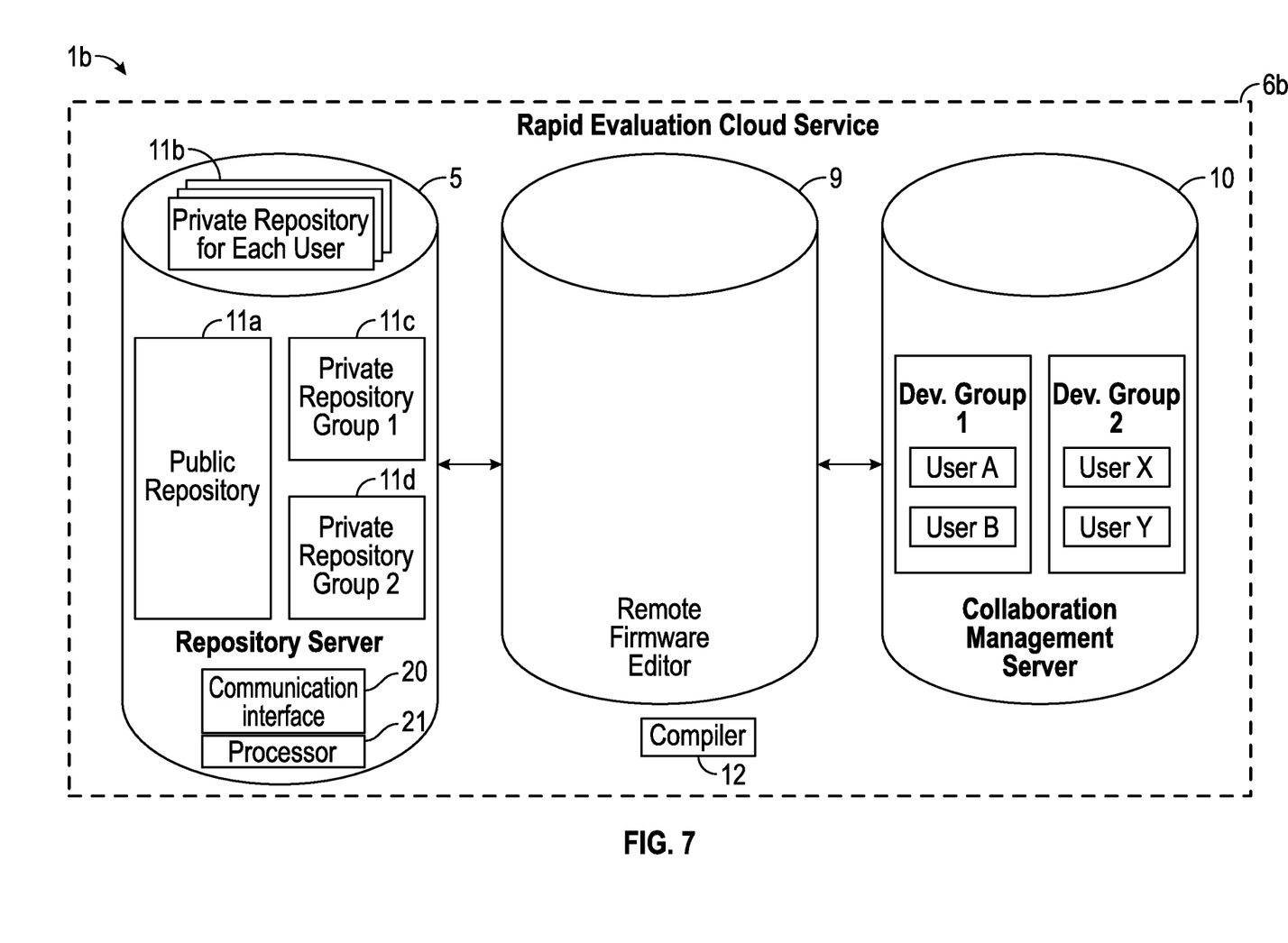
FIG. 7 shows an enlarged schematic view of the evaluation system of FIG. 6.

FIG. 7 shows an enlarged schematic view of rapid evaluation (cloud) service 6b. The firmware repository server 5 comprises a public firmware repository 11a that is accessible by all users. In addition, firmware repository server 5 comprises private firmware repositories 11b for each user. These repositories 11b are only accessible by the owning user. However, users can decide to share their private repository with one or more other users. Firmware repository server 5 further comprises private firmware repositories 11c and 11d for each user group. To these repositories 11c and 11d, each user of the respective group has access. Of course, the two shown group repositories 11c, 11d are only exemplary and the number of group repositories may differ, depending on the number of user groups setup in collaboration management server 10.

In the following and for the purposes of illustration, it is assumed that users A and B of a corporate hardware development group complete the sign up process with collaboration management server 10. After the successful sign up, user A invites user B to join a private user group "Developer Group 1". The enlarged schematic view of FIG. 7 shows the Developer Group 1, together with a further Developer Group 2, setup by users X and Y.

Once the group setup process is complete, collaboration management server 10 contacts firmware repository server 5 and sets up a private firmware repository 11c for Developer Group 1. As shown in FIG. 7, a corresponding private firmware repository 11d has been setup for Developer Group 2.

The private group firmware repositories 11c, 11d allow the members of Developer Group 1, i.e., users A and B, as well as the members of Developer Group 2, to privately store and also to privately share firmware using their respective private repositories 11c, 11d. It is noted that all users are additionally provided with access to the public firmware repository, which, as discussed in the preceding, may comprise example firmware packages for the user evaluation hardware boards 2.

Assuming that user A, using, e.g., the remote firmware editor 9, either using a public repository example or starting 'from scratch' has established a firmware package for his user evaluation hardware board 2. As discussed in the preceding, once the user's editing is completed, the firmware is compiled by compiler 12 and then stored as a firmware package (compiled and source code versions) in firmware repository server 5 and more precisely, in the private repository of Developer Group 1.

Figure 8:
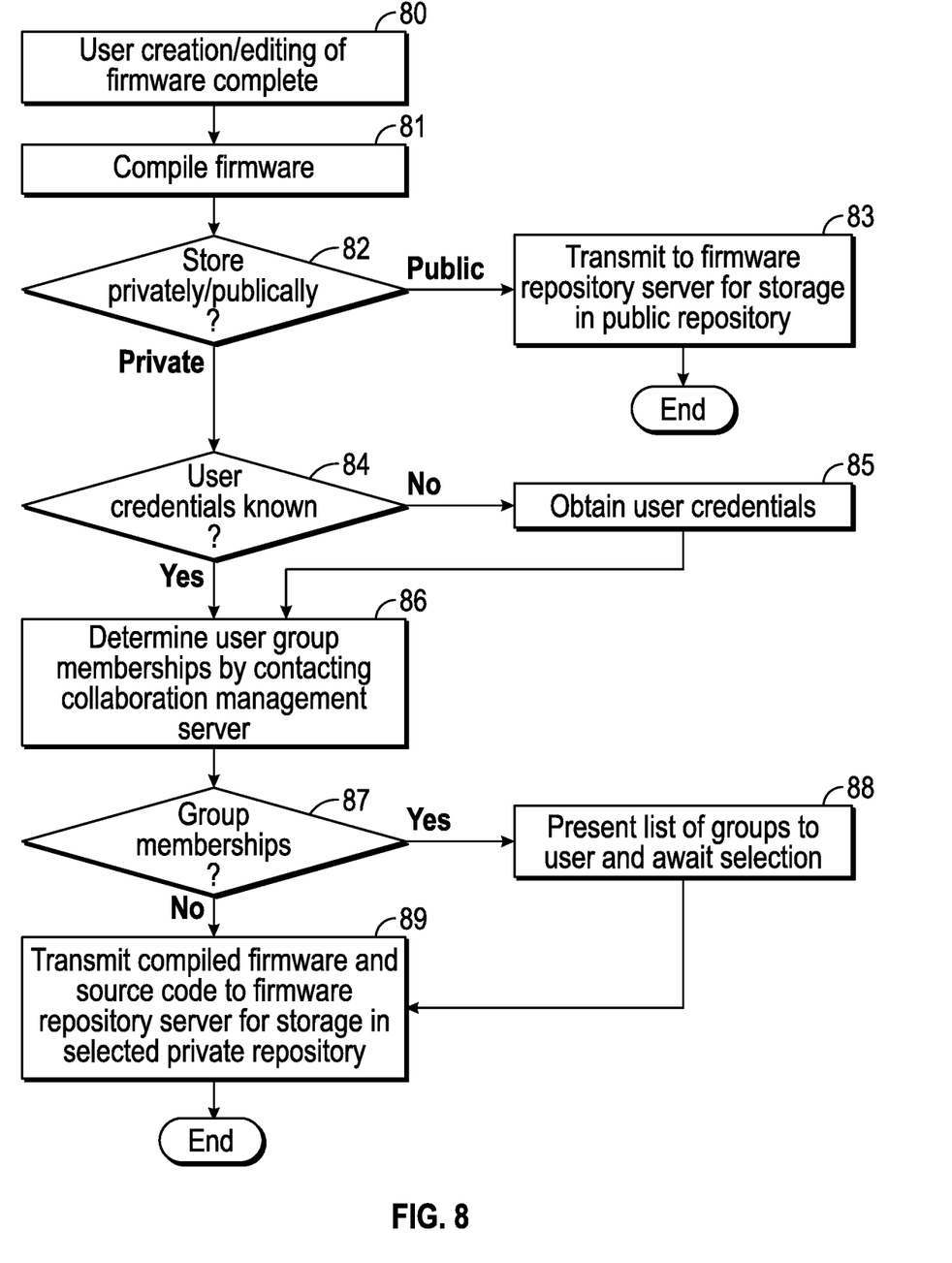
FIG. 8 shows a schematic flow diagram of the operation of the evaluation system of the embodiment of FIG. 6.

The details of this procedure are shown in the flow diagram of FIG. 8. In step 80, the user creates or edits firmware. Once complete and in step 81, the compiler 12 compiles the firmware.

In step 82, the remote firmware editor 9, before storing, provides a prompt to the user to select a storage location, namely a) the public repository 11a, b) a private repository. If storage in the public repository 11a is selected, a firmware package, comprising the compiled and source code versions of the user's firmware is transmitted to the firmware repository server 5 for storage in the public repository 11a in step 83.

If storage in the private group repository is selected in step 82, the remote firmware editor 9 in step 84 determines, if the user's credentials are known, i.e., user account and password. If this is not the case, the remote firmware editor 9 in step 85 prompts user A for his account credentials and then contacts collaboration management server 10 to identify the user and eventual group memberships in step 86. If the user's credentials are known, step 86 is performed directly.

In step 87, it is determined if user A is a member of one or more groups. If this is not the case, the firmware package is transmitted to repository server 5 and stored in the user's private repository 11b in step 89. Otherwise, in step 88, a further prompt is provided to select either storage in the user's private repository 11b or in one of the group repositories that belong to groups that the user is a member of. In step 89, the firmware package is transmitted to repository server 5 for storage in the selected repository, i.e., the user's private repository 11b or a group repository.

Once the user's firmware package is stored on the firmware repository server 5, user A may then, using the interfacing host application 7 installed on mobile device 4a, send an evaluation message to user B. The evaluation message may comprise a personal note and a link to the stored firmware package that, when selected by user B, will automatically download the compiled firmware to mobile device 4b and the associated user evaluation hardware board 2. Once the evaluation message sets up a "link" between users A and B with regard to the shared firmware and upon an update to the firmware, e.g., using the remote firmware editor 9 by user B, the respective other user, e.g. in this example user A, will receive an automatic update message from repository server 5 once the updated firmware is available for download and further evaluation.

While the invention has been illustrated and described in detail in the drawings and foregoing description, such illustration and description are to be considered illustrative or exemplary and not restrictive; the invention is not limited to the disclosed embodiments.

Additions, modifications, subtractions, and other alterations may be made to the example embodiments of the present disclosure without departing from the spirit and teachings of the present disclosure. For example, it is possible to operate the invention in any of the preceding embodiments, in which:

- an improved handshake is used to identify board and/or (wireless) communication parameters using the aforementioned machine-readable code and the camera of the mobile device 4, wherein the code also comprises board and/or (wireless) communication parameters;
- an improved handshake is used to identify board and/or (wireless) communication parameters using the aforementioned camera of the mobile device 4 and LEDs on the user evaluation hardware board 2, wherein the LEDS emit a pattern that comprises board and/or (wireless) communication parameters, which pattern is captured by the camera and subsequently decoded;
- the firmware repository server 5 comprises pricing information and the interfacing host application allows 7 allows the user to make a payment prior to downloading a particular firmware;
- the interfacing host application 7 allows browsing for evaluation boards for specific purposes and to order such additional evaluation boards; and/or
- in which the user evaluation hardware board 2 comprises a Wi-Fi interface, so that, once the user evaluation hardware board 2 is configured/bootstrapped using the mobile device 4 or computer 3, a direct connection to the rapid evaluation (cloud) service 6, 6a, 6b is possible.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measures cannot be used to advantage. Programming may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A system for improved evaluation of one or more evaluation hardware boards, the system comprising a firmware repository server and a compiler, the firmware repository server comprising a communication interface for connection to one or more client devices, wherein the firmware repository server comprises a plurality of firmware packages for the one or more evaluation hardware boards, and wherein the firmware repository server comprises a processor, configured to:
receive a firmware request for a selected one of the one or more evaluation hardware boards from a first of the client devices;
determine, which of the plurality of firmware packages are compatible firmware packages, which compatible firmware packages are suitable for the selected one of the one or more evaluation hardware boards;
generate a catalog of the compatible firmware packages for the selected one of the one or more evaluation hardware boards, which catalog comprises a description of the compatible firmware packages that can be displayed to a user;
transmit the generated catalog to the first client device for display to the user;
receive, after the catalog has been transmitted, a request for a user selected firmware package from the first client device, which user selected firmware package comprises uncompiled firmware;
communicate with the compiler to obtain compiled firmware of the user selected firmware package; and
transmit the compiled firmware of the user selected firmware package to the first client device.

2. The system of claim 1, wherein the request for firmware comprises an identifier of the selected one of the one or more evaluation hardware boards and each of the plurality of firmware packages comprises a compatibility identifier.

3. The system of claim 1, wherein the catalog comprises metadata of the compatible firmware packages.

4. The system of claim 1, wherein the processor of the firmware repository server is additionally configured to determine, if a secondary application is required for the user selected firmware package, and in case the secondary application is required, to transmit the secondary application to the client device.

5. The system of claim 4, wherein the secondary application is configured for execution on the client device and for interfacing with the user selected firmware package when executed on the selected one of the one or more evaluation hardware boards.

6. The system of claim 1, wherein the client device is one or more of a mobile computing device, a smart phone, and a tablet computer.

7. The system of claim 1, further comprising a remote firmware editor, connected with the firmware repository server and configured to provide a graphical firmware editor.

8. The system of claim 7, wherein the remote firmware editor is configured to access a first firmware package of the plurality of firmware packages of the firmware repository server and to display source code firmware of the first firmware package to the user using the graphical firmware editor.

9. The system of claim 7, wherein the remote firmware editor is configured to create a new firmware package from user entry of firmware source code.

10. The system of claim 7, further comprising a compiler to compile edited or created firmware packages.

11. The system of claim 1, further comprising a collaboration management server, connected with the firmware repository server and configured with one or more user accounts, wherein the firmware repository server is configured to control access to one or more of the plurality of firmware packages based on the one or more user accounts.

12. The system of claim 11, wherein the firmware repository server comprises a public firmware repository for one or more firmware packages and one or more private firmware repositories for one or more firmware packages, wherein the firmware repository server is configured to control access at least to the one or more private firmware repositories based on the one or more user accounts.

13. The system of claim 12, wherein the collaboration management server is configured with one or more user groups and the firmware repository server is configured to control access to one or more of the private firmware repositories based on the one or more user groups.

14. The system of claim 1, further comprising the first client device, wherein the first client device is connectable to the selected one of the one or more evaluation hardware boards.

15. A method of improved evaluation of one or more evaluation hardware boards, the method comprising, by a processor:
receiving a firmware request for a selected one of the one or more evaluation hardware boards from a client device;
determining from a firmware repository, comprising a plurality of firmware packages, which of the plurality of firmware packages are compatible firmware packages, suitable for the selected one of the one or more evaluation hardware boards;
generating a catalog of the compatible firmware packages for the selected one of the one or more evaluation hardware boards, which catalog comprises a description of the compatible firmware packages that can be displayed to a user;
transmitting the generated catalog to the client device for display to the user;
receiving, after the catalog has been transmitted, a request for a user selected firmware package from the catalog of compatible firmware packages, which user selected firmware package comprises uncompiled firmware;
obtain compiled firmware of the user selected firmware package; and
transmitting the compiled firmware of the user selected firmware package to the client device.

16. A non-transitory computer-readable medium including contents that are configured to cause a processor to:
receive a firmware request for a selected one of the one or more evaluation hardware boards from a client device;
determine from a firmware repository, comprising a plurality of firmware packages, which of the plurality of firmware packages are compatible firmware packages, suitable for the selected one of the one or more evaluation hardware boards;
generate a catalog of the compatible firmware packages for the selected one of the one or more evaluation hardware boards, which catalog comprises a description of the compatible firmware packages that can be displayed to a user;
transmit the generated catalog to the client device for display to the user;
receive, after the catalog has been transmitted, a request for a user selected firmware package from the catalog of compatible firmware packages, which user selected firmware package comprises uncompiled firmware;
obtain compiled firmware of the user selected firmware package; and
transmit the compiled firmware of the user selected firmware package to the client device; wherein
the compatible firmware packages are configured to allow testing of at least one functionality of the selected one of the one or more evaluation hardware boards.

17. A system for improved evaluation of one or more evaluation hardware boards, the system comprising a firmware repository server, the firmware repository server comprising a communication interface for connection to one or more client devices, wherein the firmware repository server comprises a plurality of firmware packages for the one or more evaluation hardware boards, wherein each of the plurality of firmware packages comprises a compatibility identifier, and wherein the firmware repository server comprises a processor, configured to:

receive a firmware request for a selected one of the one or more evaluation hardware boards from a first of the client devices, wherein the request comprises an identifier of the selected one of the one or more evaluation hardware boards;
determine, which of the plurality of firmware packages are compatible firmware packages, which compatible firmware packages are suitable for the selected one of the one or more evaluation hardware boards;
generate a catalog of the compatible firmware packages for the selected one of the one or more evaluation hardware boards, which catalog comprises metadata of the compatible firmware packages;
transmit the generated catalog to the first client device for display to a user;
receive, after the catalog has been transmitted, a request for a user selected firmware package from the catalog of compatible firmware packages; and
transmit firmware of the user selected firmware package to the first client device; wherein
the processor is configured to determine, if a secondary application is required for the user selected firmware package, and in case the secondary application is required, to transmit the secondary application to the client device.

* * * * *